United States Patent [19]

Schläfer et al.

[11] Patent Number: 4,845,202
[45] Date of Patent: Jul. 4, 1989

[54] WATER-SOLUBLE DISAZO COMPOUNDS CONTAINING 3-CARBOXY OR 3-CARBAMOYLPYRIDIUM-S-TRIAZINYL GROUPS AND FIBER-REACTIVE GROUPS OF THE VINYL SULFONE SERIES SUITABLE AS DYESTUFFS

[75] Inventors: Ludwig Schläfer, Kelkheim; Hartmut Springer; Reinhard Hähnle, both of Königstein/Taunus, all of Fed. Rep. of Germany

[73] Assignee: Hoechst Aktiengesellschaft, Frankfurt am Main, Fed. Rep. of Germany

[21] Appl. No.: 113,528

[22] Filed: Oct. 23, 1987

[30] Foreign Application Priority Data

Oct. 25, 1986 [DE] Fed. Rep. of Germany ....... 3636398

[51] Int. Cl.[4] .................... D09B 44/12; D09B 62/513; B06P 1/384; B06P 1/41
[52] U.S. Cl. .................................. 534/605; 534/589; 534/617; 534/621; 534/632; 534/635; 534/637; 534/642
[58] Field of Search .................. 534/605, 642, 617

[56] References Cited

U.S. PATENT DOCUMENTS

| | | | |
|---|---|---|---|
| 4,300,902 | 11/1981 | Connor | 8/529 |
| 4,323,497 | 4/1982 | Hoyer et al. | 534/605 X |
| 4,453,945 | 6/1984 | Miyamoto et al. | 534/605 X |
| 4,544,737 | 10/1985 | Stohr et al. | 534/605 |
| 4,626,589 | 12/1986 | Omura et al. | 534/605 |
| 4,667,021 | 5/1987 | Toda et al. | 534/625 |

FOREIGN PATENT DOCUMENTS

| | | | |
|---|---|---|---|
| 0167219 | 1/1986 | European Pat. Off. | 534/605 |
| 2634308 | 2/1977 | Fed. Rep. of Germany | 534/605 |
| 3514969 | 10/1986 | Fed. Rep. of Germany | 534/605 |
| 60-86169 | 5/1985 | Japan | 534/605 |
| 60-90264 | 5/1985 | Japan | 534/605 |
| 62-132966 | 6/1987 | Japan | 534/605 |

*Primary Examiner*—Floyd D. Higel

[57] ABSTRACT

Water-soluble disazo compounds having useful fiber-reactive dye properties, which conform to the general formula (1) defined hereinafter and dye carboxamido- and/or hydroxy-containing materials in fast shades. Fast dyeings on cellulose fiber materials can also be obtained in a weakly acid to neutral pH range, for example together with disperse dyes for dyeing a polyester fiber portion.

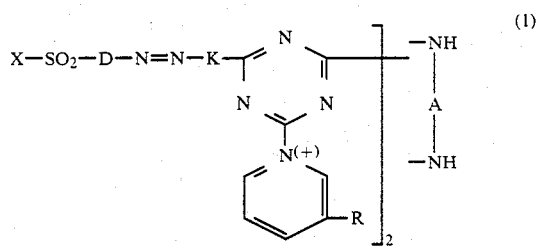

in which:
A is phenylene which may be substituted by methyl, ethyl, methoxy, chlorine or sulfo, or is a radical of the formula

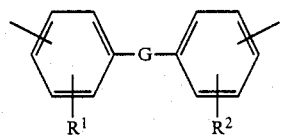

in which G is a direct bond or a group of the formula —CH=CH— or —NH—CO—NH— and $R^1$ and $R^2$ are each independently of the other hydrogen, sulfo, methyl, ethyl, methoxy or ethoxy;
D is phenylene which may be substituted by methyl, ethyl, methoxy, ethoxy, sulfo, carboxy, chlorine or bromine, or is naphthalene which may be substituted by sulfo or is a group of the formula

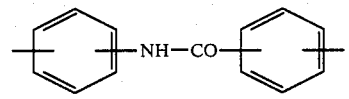

and
K, as a radical of a coupling component, is a radical of the formula

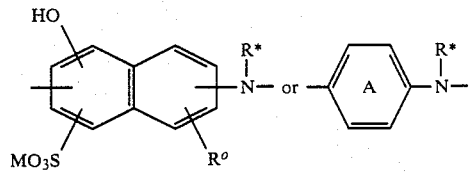

in which M is hydrogen or an alkali metal and $R^o$ is hydrogen or sulfo and the free azo-bond in the aminonaphthol radical is ortho to the hydroxy group, $R^*$ is hydrogen, methyl or ethyl and the benzene nucleus a can be substituted by methyl, ethyl, methoxy, ethoxy lower alkanoylamino, benzoylamino, ureido or chlorine;
X is vinyl, β-sulfatoethyl or β-chloroethyl;
R is carboxy or carbamoyl.

16 Claims, No Drawings

WATER-SOLUBLE DISAZO COMPOUNDS CONTAINING 3-CARBOXY OR 3-CARBAMOYLPYRIDIUM-S-TRIAZINYL GROUPS AND FIBER-REACTIVE GROUPS OF THE VINYL SULFONE SERIES SUITABLE AS DYESTUFFS

DESCRIPTION

The present invention relates to the technical field of textile dyes.

At present, cellulose fibers and polyester fibers cannot be dyed with one and the same dye in a uniform and level manner owing to their different chemical natures. One is forced to dye mixed materials of these two types of fiber, such as, for example, blend fabrics, in a two-stage process, namely first dye one of the fibers with the dye suitable for that purpose then the other fiber with the dye suitable for that type of fiber, in each case under different process conditions. Such a procedure is necessarily laborious and in need of replacement. It has therefore been attempted to dye such blend fiber materials using a dye mixture comprising a fiber-reactive dye for dyeing the cellulose fiber portion and a disperse dye for dyeing the polyester fiber portion. However, this procedure has appreciable disadvantages. The reason is that fiber-reactive dyes are customarily fixed on the cellulose fiber in an alkaline medium and disperse dyes, like to a certain extent the polyester fiber also, are customarily sensitive to alkali. The consequence is accordingly that, in fixing the fiber-reactive dyes in an alkaline medium, the disperse dyes which are present at the same time and in certain circumstances the polyester fibers also can be damaged.

It was thus an object to reduce or even to remedy these previously disclosed disadvantages, in particular since the dyeing of blend fabrics, such as, for example, those of cellulose and polyester fibers, is becoming increasingly important. There thus also exists an increased interest in dyes which facilitate the dyeing of such blend fabrics, in particular in fiber-reactive dyes which are capable of becoming fixed on the cellulose fiber in the nonalkaline range and, in addition, can be employed at very low dyeing temperatures.

For instance, German Offenlegungsschrift No. 2,634,308 and U.S. Pat. No. 4,300,902 propose that such blend fiber materials be dyed with dyes which contain one or more s-triazinyl groups having a quaternary nitrogen substituent, such as a pyridinium radical, for example nicotinic acid, and later, according to U.S. Pat. No. 4,453,945, dyes of the same type having specifically a nicotinic acid radical as quaternary nitrogen substituent have been used for dyeing cellulose fibers and cellulose/polyester blend fibers. However, these dyes and the dyeing methods used therefor have disadvantages. While the dyes of German Offenlegunsschrift No. 2,634,308 and U.S. Pat. No. 4,300,902 require dyeing temperatures of over 150° C., and by contrast the dyeing method of U.S. Pat. No. 4,453,945, according to its own statements, is feasible at dyeing temperatures below 150° C., the dyes mentioned in these three publications nonetheless have the serious disadvantage that their color yield, when used to dye cellulose fiber materials, such as cotton, by the exhaust method, is highly dependent on the pH value of the dye bath. Consequently, the depth of shade of dyeings with these known dyes on cotton fibers at pH values between 4 and 8 varies greatly, the general maxim being that the depth of shade increases with increasing pH and the maximum depth of shade, as with all conventional fiber-reactive dyes, is obtained in the strongly alkaline range, i.e. above a pH of 9 or even 10. In addition, the buildup of dyeings with these dyes, i.e. the relation between amount of dye used and color yield obtained on the cellulose fiber (color strength or depth of a shade), is inadequate, since beyond certain concentrations of dye in the dye bath the color yield on the fiber does not increase further as the amount of dye is increased to obtain deeper shades. These defects are also found with the dyes described in European Patent Application Publication No. 0,167,219A, which, in addition to a pyridinium-substituted s-triazinyl radical, contain a fiber-reactive group of vinylsulfonyl type. The same applies to the dyes described in U.S. Pat. No. 4,323,497.

The present invention now provides new water-soluble compounds which conform to the general formula (1) mentioned and defined hereinafter, have fiber-reactive properties and not only can be used with advantage for dyeing cellulose fibers in the alkaline range but, surprisingly, are capable of becoming fixed on cellulose fibers even in the weakly acid and neutral range, namely under conditions of the so-called high-temperature neutral dyeing method (HTN method) at temperatures between 100° and 150° C. and at a pH value between 4 and 8 in an aqueous medium, i.e. under the conditions of dyeing polyester fibers. By providing the new dyes of the general formula (1) it has become possible to use the hitherto usual and customary disperse dyes together with these new dyes in one-stage dyeing processes for dyeing cellulose/polyester fiber blends in which the two fiber components are dyed uniformly and fast by the respective type of dye and it is possible to obtain tone-on-tone dyeings if the disperse dye used has the same shade as the fiber-reactive dye.

The fiber-reactive compounds according to the invention conform to the general formula (1)

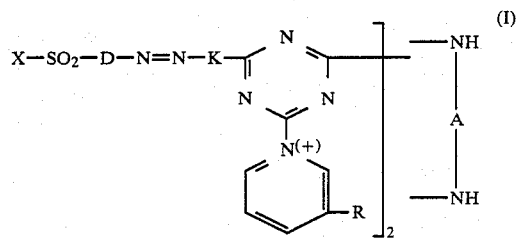

where the symbols appearing in the formula have the following meanings:

A is a phenylene radical, preferably a para-phenylene radical, which can be substituted by 1 or 2 substituents from the group consisting of methyl, ethyl, methoxy, chlorine and sulfo, preferably by a sulfo group, or is a radical of the general formula (2a)

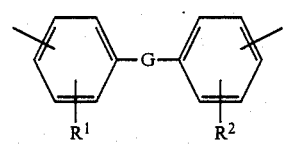

in which

G is a direct bond or a vinylidene radical of the formula —CH=CH— or a bivalent urea radical of the formula —NH—CO—NH—, $R^1$ denotes a hydrogen atom or a sulfo, methyl, ethyl, methoxy or ethoxy group, preferably a sulfo group, and $R^2$ has one of the meanings of $R^1$ and is identical to $R^1$ or different from $R^1$;

D is a benzene ring which can be substituted by 1 or 2 substituents which are selected from the set consisting of 2 methyl groups, 2 ethyl groups, 2 methoxy groups, 2 ethoxy groups, 1 sulfo groups, 1 carboxy group, 1 chlorine atom and 1 bromine atom, or D is a naphthalene ring which can be substituted by a sulfo group, or D is a radical of the formula (2b)

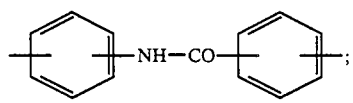
(2b)

K, as a radical of a coupling component, is an aminonaphtholsulfonic acid radical of the general formula (3)

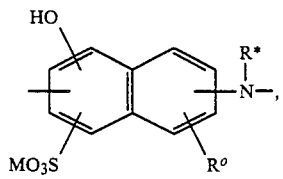
(3)

of which preferably a radical of the general formula (3a), (3b) or (3c)

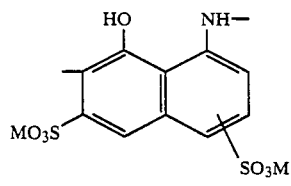
(3a)

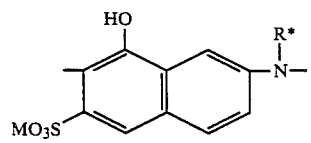
(3b)

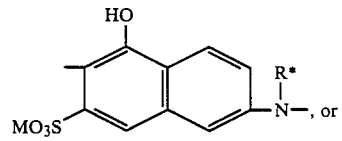
(3c)

K is a radical of the general formula (4)

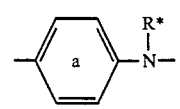
(4)

in which

M stands for a hydrogen atom or an alkali metal, such as sodium, potassium or lithium, $R^o$ is a hydrogen atom or a sulfo group, the free azo bond in the formula (3) is ortho to the hydroxy group, $R^*$ is an ethyl group, or preferably a hydrogen atom or a methyl group, and the —SO₃M group in the formula (3a) is meta or para to the NH group and the benzene nucleus a can be substituted by 1 or 2 substituents from the group consisting of methyl, ethyl, methoxy, ethoxy, alkanoylamino of 2 to 5 carbon atoms, such as acetylamino, benzoylamino, ureido and chlorine;

X is a vinyl group, a β-sulfatoethyl or a β-chloroethyl group;

R is a carboxy group or a carbamoyl group;

the sulfo, sulfato and carboxy groups form anions equivalent to the pyridinium cation.

of the radicals of the general formula (4), preference is given to a radical of the general formula (3d)

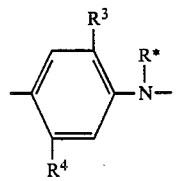
(3d)

in which $R^3$ is a hydrogen atom or a methyl or methoxy group and $R^4$ is a methyl, methoxy, acetylamino or ureido group.

Those symbols which each appear twice in the formula, namely D, K, X and R, can each have the same meaning in both cases or a different meaning in each case; preferably they have the same meaning. Preference is thus given to those of the disazo compounds according to the invention of the general formula (1) which are symmetrically constructed compounds.

In the disazo compounds of the general formula (1), X is preferably a vinyl group and particularly preferably a β-sulfatoethyl group. A is preferably an unsubstituted or sulfo-substituted p-phenylene radical, a 2,2'- or 3,3'-disulfodiphen-4,4'-ylene radical or a radical of the formula (2c) or (2d)

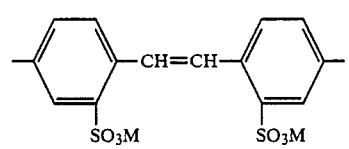
(2c)

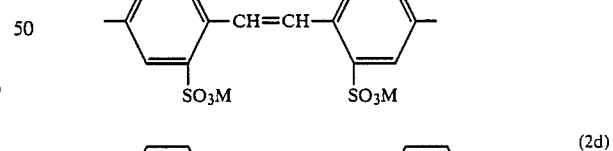
(2d)

where M has the abovementioned meaning. D is preferably a benzene ring which can be substituted by 1 or 2 substituents which are selected from the set consisting of 2 methoxy groups, 1 methyl group, 1 chlorine atom and 1 bromine atom, or preferably is a naphthalene ring which can be substituted by a sulfo group. of the disazo compounds according to the invention, in particular the disazo compounds according to the invention described in Working Example 7 and in Table Examples 8, 9, 20, 22, 35, 39 and 47 can be singled out.

The compounds according to the invention can be present in the form of their free acids and in the form of their salts, in particular the neutral salts. They are preferably in the form of their salts, in particular their alkali metal salts. They are preferably used in the form of these salts for dyeing and printing hydroxy and/or carboxamido-containing fiber materials.

The present invention further relates to processes for preparing the compounds according to the invention. The compounds according to the invention can be prepared by reacting a compound of the general formula (5)

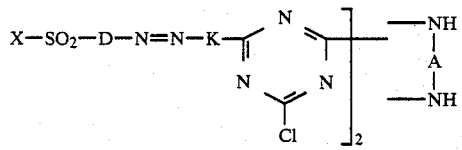

in which A, D, K and X have the meanings indicated for the formula (1), with nicotinic acid or nicotinamide. This reaction is carried out in a manner similar to the process measures customary for this type of reaction, as mentioned, for example, in previously cited European Patent Application Publication No. 0,167,219. Preferably, the reaction according to the invention takes place in an aqueous medium at a pH value between 4 and 6, in particular between 4 and 5, and preferably at a temperature between 60° and 100° C., preferably between 80° and 90° C.

The starting compounds of the general formula (5) are substantially known from previously cited U.S. Pat. No. 4,323,497 or can be synthesized similarly to the directions given therein.

Furthermore, the compounds according to the invention can be prepared in a manner according to the invention by coupling a compound of the general formula (6)

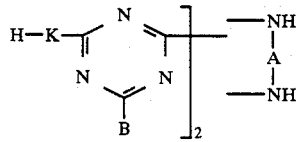

in which A, B and K have the abovementioned meanings, with the diazonium compound of an aromatic amine of the general formula (7)

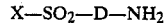 (7)

in which D and X have the abovementioned meanings. Here too the coupling reaction is carried out similarly to procedures well known for this purpose, for example in an aqueous solution at a pH value between 4 and 7 and at a temperature between 0° and 30° C.

The starting compounds of the general formula (6) can be prepared by reacting cyanuric chloride in any desired order with the amino compounds of the general formulae H—K—H and H₂N—A—NH₂, where K and A have the abovementioned meaning, similarly to the known procedures to give a compound of the general formula (8)

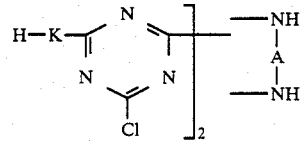

in which A and K have the abovementioned meanings. The starting compounds (8) are substantially known from previously cited U.S. Pat. No. 4,323,497 or can be synthesized similarly to the directions given therein. Subsequently, the compounds (8) are converted by reaction with nicotinic acid or nicotinamide in a manner similar to the above directions for the reaction of the compounds of the general formula (5) with nicotinic acid or nicotinamide into the starting compounds of the general formula (6).

The precipitation and isolation of the compounds of the general formula (1) prepared according to the invention from the synthesis solutions is carried out in a conventional manner, for example by precipitating from the reaction medium by means of electrolytes or by evaporating the reaction solution, for example by spray drying, if desired after buffer substances have been added to the synthesis solution.

The compounds according to the invention have dye properties. As a consequence of the fiber-reactive groups they possess, they can also be used as fiber-reactive dyes. They can be employed in customary and known methods of applying and fixing fiber-reactive dyes on hydroxy-containing and/or carboxamido-containing materials, in particular fiber materials, for dyeing (including printing), for example wool, synthetic polyamide fibers, but in particular cellulose fiber materials, such as cotton. These methods have been described in large numbers in the trade literature, including the patent literature, for example in German Offenlegungsschrift No. 3,440,265.

The present invention thus also relates to the use of the compounds according to the invention for dyeing (including printing) hydroxy-containing and/or carboxamido-containing materials, in particular fiber material, specifically to a process for dyeing (including printing) such materials where a compound according to the invention is applied to the material, preferably from an aqueous solution, and fixed on the material by means of heat and/or by means of an acid-binding agent—in the case of dyeing of hydroxy-containing materials preferably at a pH value between 8 and 11 and at a temperature between 15° and 120° C., preferably between 20° and 80° C.

The compounds according to the invention in addition have the great advantage, mentioned at the beginning, that they are capable of dyeing hydroxy-containing fiber materials, such as cellulose fiber materials, from an aqueous liquor, preferably in an aqueous dye bath, by an exhaust method, even in the weakly acid pH range of 5 and greater than 5, that is at a pH value between 5 and 7, i.e. surprisingly in the absence of alkaline substances, but if desired in the presence of a customary acid-binding buffer mixture for setting and maintaining the pH range and if desired in the presence of customary dyeing assistants, at a temperature between 100° and 150° C., preferably at a temperature of 120° to 135° C., and become fixed on these materials with fast results. Such buffers are for example aqueous solutions of phosphoric acid/sodium phosphate and acetic acid/sodium acetate.

Under these dyeing conditions of the high-temperature neutral dyeing process, which are known per se (see German Auslegeschrift No. 2,835,035) and which essentially correspond to the dyeing conditions of dyeing polyester fibers or other synthetic fibers, such as cellulose triacetate fibers, with disperse dyes, it is possible to dye advantageously cellulose blend fiber materials, such as cellulose/cellulose triacetate fiber and cellulose/polyacrylonitrile fiber and in particular cellulose/polyester blend fiber materials, with a customary disperse dye at the same time and together with a fiber-reactive dye, namely an azo compound according to the invention, from a common aqueous dye liquor without the otherwise existing danger of damaging the disperse dye or the synthetic fiber, such as polyester fiber, in a one-stage process, and if desired tone-on-tone, to give uniform and fast results.

The present invention also relates to a process for dyeing blend fiber materials of cellulose and synthetic fibers, preferably cellulose/polyester fiber blends, with one or more disperse dyes and one or more dyes according to the invention by action of these dyes on the fiber material from an aqueous dyeing liquor, preferably from an aqueous dye bath, at a temperature between 100° and 150° C., preferably at a temperature of 120° to 135° C., and at a pH value between 4 and 8, if necessary between 5 and 7.5 , preferably between 5 and 7.

Using this dyeing method according to the invention, the synthetic fibers, such as polyester fibers, are dyed by the disperse dye and the cellulose fibers by the fiber-reactive azo compound according to the invention in the desired high quality (without the synthetic fiber, such as a cellulose triacetate or polyester fiber, being stained by the azo compounds according to the invention). The quality of the dyeing on the synthetic fibers is contingent upon the disperse dye and corresponds to the state of the art. Surprisingly, the cellulose fiber materials which are dyed with the azo compounds according to the invention under these conditions of dyeing with disperse dyes not only have a bright shade but considerable fastness properties (these fastness properties are present in any case when the azo compounds according to the invention are applied to the cellulose fiber materials in the alkaline range by the customary methods of applying and fixing fiber-reactive dyes). Of the good end-use and manufacturing fastness properties, in particular the good light fastness properties not only of the dry but also of the moist cellulose dye which has been impregnated with tap water or an alkaline perspiration solution, and also of the wet fastness properties, in particular the good wash, water, seawater, cross-dyeing and perspiration fastness properties and the good acid fading resistance and likewise good pleating, hot press, crock and sublimation fastness properties have to be singled out of dyes of cellulose fiber materials which are obtained with the azo compounds according to the invention, not only by applying methods for fiber-reactive dyes in the alkaline range, but also by applying dyeing methods for disperse dyes.

The Examples which follow serve to illustrate the invention. The parts and percentages are by weight, unless otherwise stated. Parts by weight relate to parts by volume as the kilogram relates to liter.

The compounds written in the Examples in the form of formulae have been written in the form of free acids; in general, they are prepared and isolated in the form of their alkali metal salts and used for dyeing in the form of these salts. In the same way, the starting compounds and components mentioned in the Examples, in particular Table Examples, in the form of the free acid can be used in the synthesis as such or in the form of their salts, preferably alkali metal salts, such as sodium or potassium salts.

The absorption maxima ($\lambda_{max}$ values) mentioned in the Examples for the azo compounds according to the invention in the visible range were determined on their alkali metal salts in aqueous solution.

EXAMPLES

Example 1

40.4 parts of the disazo compound described in Example 1 of U.S. Pat. No. 4,323,497 are dissolved in 500 parts of water, and 9.2 parts of nicotinamide and 30 parts of sodium acid are added; a pH value of 4.3 is set by means of glacial acetic acid, and the reaction batch is stirred at the boil for three hours. The batch is then cooled down, and the compound formed is salted out with potassium chloride, isolated, and dried at 60° to 80° C. under reduced pressure.

The result obtained is an electrolyte-containing dark red powder of the alkali metal salt (predominantly the potassium salt) of the compound of the formula

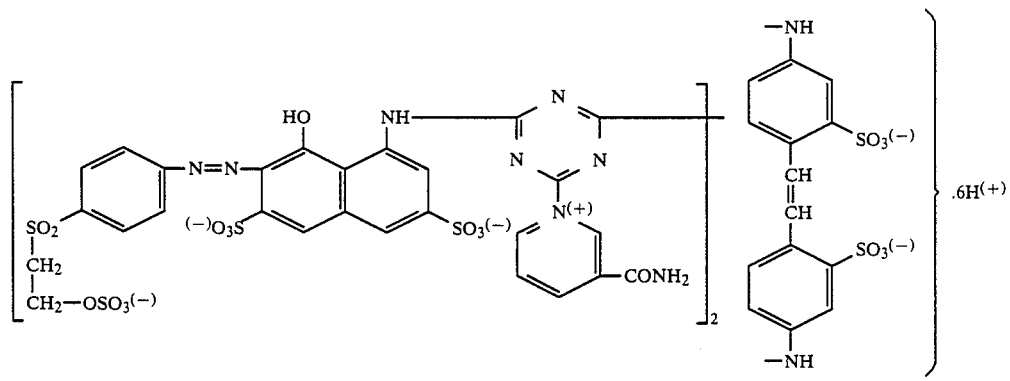

($\lambda_{max}$ = 510 nm).

This compound has very good fiber-reactive dye properties and dyes for example wool or cellulose fiber materials by the application and fixing methods customary in the art for fiber-reactive dyes. On cotton, for example, deep bluish red dyeings and prints having good fastness properties are obtained (see Application Example 2).

The compounds according to the invention can also be used with advantage for dyeing cellulose fiber materials under the conditions of dyeing polyester fibers with disperse dyes, i.e. from an aqueous solution at a pH value between 5 and 8 and at a temperature between 110° and 130° C. (see Application Example 1).

EXAMPLE 2

187.5 parts of the disazo compound described in Example 4 of the U.S. Pat. No. 4,323,497 are reacted in an aqueous solution at a pH value of 5 to 7 under reflux with 36 parts of nicotinic acid for some hours. The resulting disazo compound according to the invention is isolated in a conventional manner, for example by salting out with potassium chloride or by evaporating the solution. Written in the form of free acid, the disazo compound according to the invention has the formula parts of nicotinic acid for several hours. The resulting disazo compound according to the invention is isolated in a conventional manner. When in the form of the free acid, it has the formula

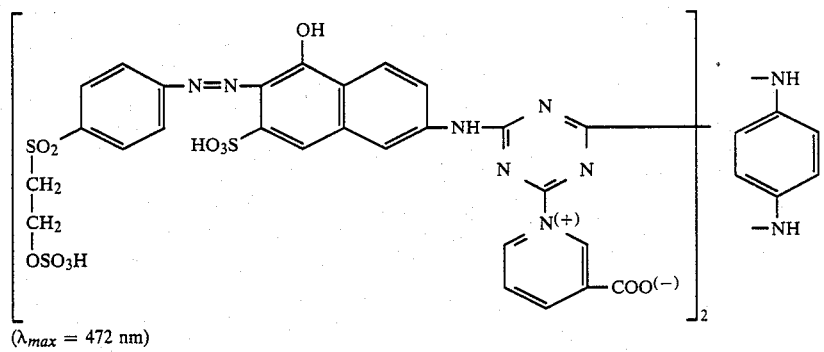

($\lambda_{max}$ = 472 nm)

and exhibits good fiber-reactive dye properties. On cellulose fiber materials, in particular, it produces on application of the customary application and fixing methods for fiber-reactive dyes in the alkaline range at dyeing temperatures of preferably up to 90° C. as well as in a neutral to weakly acid dye bath at dyeing temperatures between 100° and 140° C. deep orange dyeings having good wet and light fastness properties.

EXAMPLE 4

23.9 parts of 2-amino-5-naphthol-7-sulfonic acid are reacted in aqueous solution at a temperature between 0° and 5° C. and at a pH value of about 2 with 15.3 parts of cyanuric chloride; 5.5 parts of 1,4-diaminobenzene are then added to the reaction batch, and the next conden-

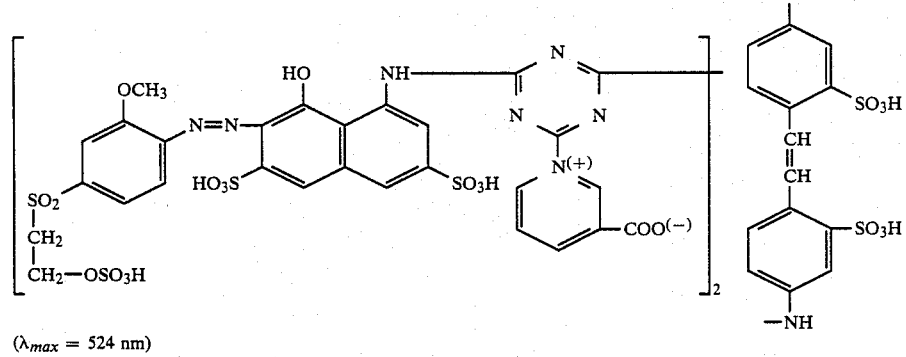

($\lambda_{max}$ = 524 nm)

and exhibits very good fiber-reactive dye properties. Under alkaline fixing conditions as encountered in the customary dyeing and printing methods for fiber-reactive dyes, it produces, in particular on cotton, deep reddish violet dyes and prints having good fastness properties.

Similarly, the so-called HTN process produces at a pH value between 6 and 7 and at a temperature between 120° and 140° C., for example analogously to Application Example 1 or 4, deep violet dyes on cellulose fiber materials, which have the same good fastness properties.

EXAMPLE 3

168.5 parts of the disazo compound described in Example 54 of U.S. Pat. No. 4,323,497 are reacted in aqueous solution at a pH value of 4 to 5 under reflux with 36 sation reaction is carried out 40° to 60° C. and at a pH value of 4 to 6. After the reaction has ended (no detectable free amine), 18.3 parts of nicotinamide are added, and the third condensation reaction is carried out by refluxing for three hours at a pH value between 4.5 and 5. The compound thus obtained, which conforms to the general formula (6) mentioned in the description, now serves as a coupling component for preparing the disazo compound according to the invention, when it is reacted directly in its synthesis solution with the aqueous suspension of the diazonium salt of 31.1 parts of 2-methoxy-5-($\beta$-sulfatoethylsulfonyl)-aniline. After the coupling reaction is ended, the disazo compound according to the invention is isolated in a conventional manner.

The result obtained is an electrolyte-containing orange-red powder of the alkali metal salt of the compound of the formula

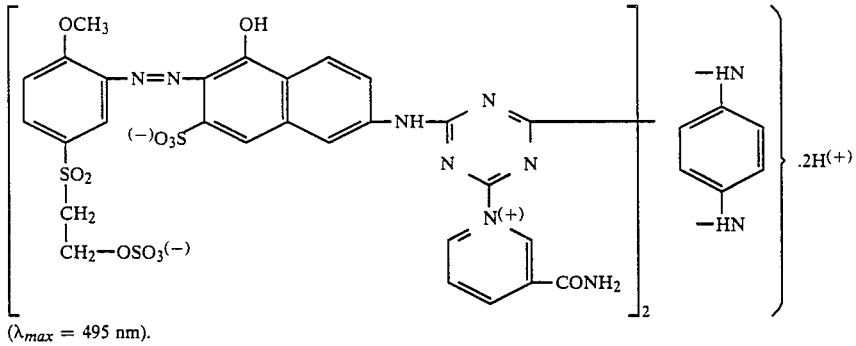

($\lambda_{max}$ = 495 nm).

This compound has very good fiber-reactive dye properties and dyes for example wool or cellulose fiber materials by the application and fixing techniques customary in the art for fiber-reactive dyes. For instance, applied analogously to Application Example 2, it produces on cotton deep reddish orange dyeing and prints having good fastness properties.

The compound according to the invention can also be used with advantage for dyeing cellulose fiber materials under the conditions of dyeing polyester fibers with disperse dyes, i.e. from an aqueous solution at a pH value between 5 and 8 and at a temperature between 120° and 150° C. (analogously to Application Example 1).

EXAMPLE 5

72.2 parts of 4-(β-sulfatoethylsulfonyl)-2-sulfoaniline are conventionally diazotized and coupled to 31 parts of 3-aminophenylurea. After the coupling has ended, the azo compound is salted out of the reaction mixture by means of sodium chloride, filtered off, dissolved in 1,000 parts of water and reacted with 39 parts of cyanuric chloride at a temperature below 10° C. and at a pH value between 4 and 5.

After the monocondensation product has been formed, an aqueous solution of 10.8 parts of 1,4-diaminobenzene in 100 parts of water is added to the reaction mixture, the pH value is brought to 5 to 5.5, and the second condensation reaction is completed at 40° to 50° C. within the pH range of 5 to 5.5 by stirring for several hours. The reaction product is salted out by means of sodium chloride and filtered off, and suspended in 1,000 parts of water, and 36 parts of nicotinamide are added. This reaction batch is stirred at a temperature between 90° and 100° C. and at a pH value between 4 and 5 for several hours, and the resulting disazo compound according to the invention is then salted out of the reaction mixture by means of potassium chloride.

Filtration and drying give the alkali metal salt (predominantly the potassium salt) of the compound of the formula

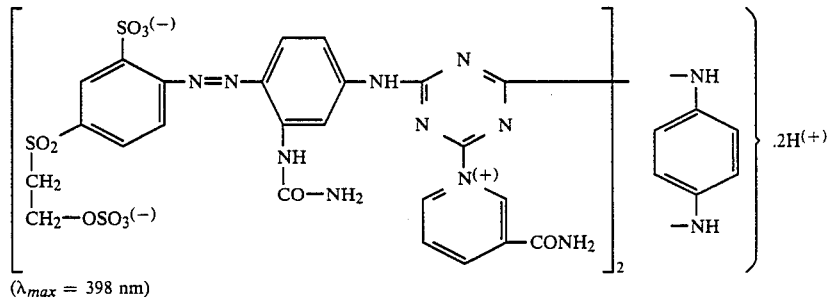

($\lambda_{max}$ = 398 nm)

in the form of an electrolyte-containing (predominantly potassium chloride-containing) brown powder.

This compound has very good fiber-reactive dye properties and dyes for example wool or cellulose fiber materials by the application and fixing techniques customary in the art for fiber-reactive dyes. For example, applied analogously to Application Example 2, it produces on cotton deep dyeing and prints having a yellowish brown shade and good fastness properties.

The compound according to the invention can also be used with advantage for dyeing cellulose fiber materials from an aqueous solution at a pH value between 5 and 8 and at a temperature between 110° and 130° C. under the conditions of the HTN process (for example analogously to Application Example 1).

EXAMPLE 6

18.5 parts of cyanuric chloride are reacted with 31.9 parts of 1-amino-8-napthol-3,6-disulfonic acid and 20.7 parts of the disodium salt of 4,4'-diaminostilbene-2,2'-disulfonic acid in accordance with the directions of Example 1 of U.S. Pat. No. 4,323,497. To synthesize the disazo compound according to the invention, the condensation product thus prepared serves as a coupling component which is then reacted with the diazonium salt of 36 parts of 2-bromo-4-(β-sulfatoethylsulfonyl)-aniline.

The disazo compound thus obtained is then reacted in its synthesis solution with 18.5 parts of nicotinic acid at a pH value of 4.5 to 5.0 and at a temperature of about 95° C. for 3 hours to give the disazo compound according to the invention, which is then salted out by adding potassium chloride or isolated by evaporating or spray drying the reaction solution. Written in the form of the free acid, the disazo compound according to the invention has the formula

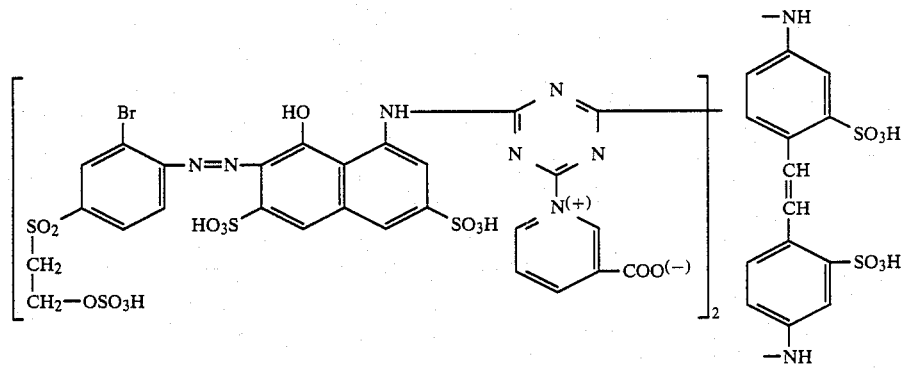

($\lambda_{max}$ = 514 nm)

and exhibits very good fiber-reactive dye properties. For example, under the alkaline fixing conditions of the customary dyeing and printing methods for fiber-reactive dyes, it produces on cotton deep bluish red dyeings and prints having good fastness properties.

Similarly, the so-called HTN process produces at a pH value between 6 and 7 and at a temperature between 120° and 140° C., for example analogously to Application Example 1 or 4, deep violet dyeings on cellulose fiber materials which have the same good fastness properties.

EXAMPLE 7

Example 4 is repeated, except that 15.3 parts of cyanuric chloride are reacted with 23.9 parts of 2-amino-5-naphthol-7-sulfonic acid and then with 5.5 parts of 1,4-diaminobenzene and subsequently, in place of the nicotinamide of Working Example 4, with 18 parts of nicotinic acid. The coupling component thus obtained is then treated in its aqueous synthesis solution with an aqueous suspension of the diazonium salt of 41.1 parts of 1-sulfo-6-(β-sulfatoethylsulfonyl)-2-aminonaphthalene, and the coupling reaction is carried out at a pH value between 5 and 6.

The resulting diazo compound according to the invention is isolated in a conventional manner. Written in the form of the free acid, it has the formula

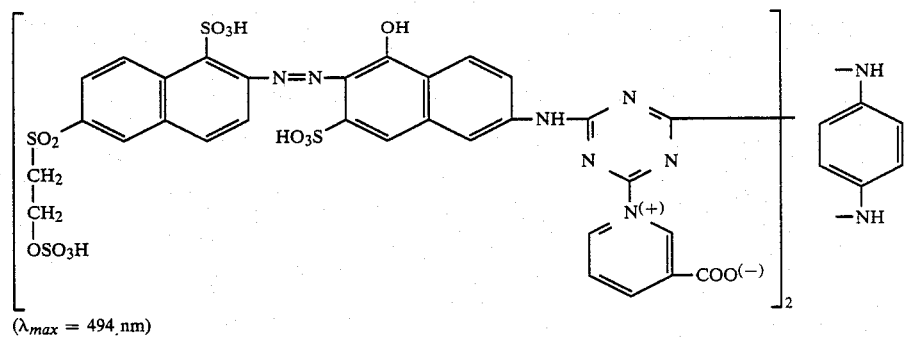

($\lambda_{max}$ = 494 nm)

and exhibits very good fiber-reactive dye properties. On cellulose fiber material, in particular, it produces by the customary application and fixing techniques for fiber-reactive dyes in the alkaline range at dyeing temperatures of preferably up to 90° C. as well as in a neutral or weakly acid dye bath at dyeing temperatures between 100° and 140° C., deep orange dyeings having good wet and light fastness properties.

EXAMPLES 8 to 18

The Table Examples which follow describe further disazo compounds according to the invention in terms of the symbols appearing in a general formula (A)

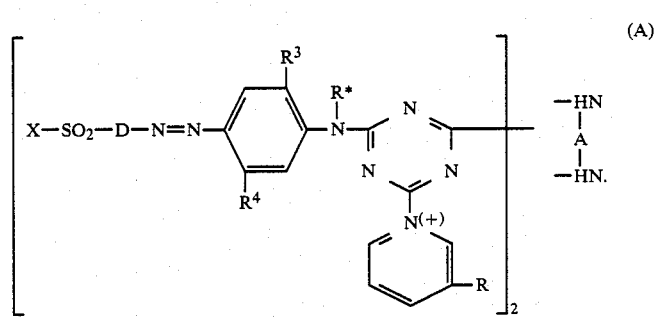

The compounds according to the invention can be prepared in a manner according to the invention, for example analogously to one of the above Working Examples, using the components evident from the Table Examples, and cyanuric chloride. They have good fiber-reactive dye properties and, not only in the presence of alkaline agents at dyeing temperatures (fixing temperatures) of up to 100° C. but also in the weakly acid to neutral or weakly alkaline range at temperatures between 100° and 140° C., produce on cellulose fiber materials deep, fast dyeings and prints in the hue indicated in the particular Table Example.

the 6- and 7-positions marked therein are intended to indicate whether the bond of the triazinylamino radical is bonded to the naphthol radical in the 6- or in the 7-position. The compounds according to the invention can be prepared in a manner according to the invention, for example analogously to one of the above Working Examples, using the components evident from the Table Examples, and cyanuric chloride. They have good fiber-reactive dye properties and, not only in the presence of alkaline agents at dyeing temperatures (fixing temperatures) of up to 100° C., but also in the weakly acid to neutral or weakly alkaline range at tem-

| Example | Radical A | Group R | Group X—SO₂—D- | Substituent R⁴ | Substituent R³ | R* | Hue (λ$_{max}$ = ... nm) |
|---|---|---|---|---|---|---|---|
| 8 | 1,4-Phenylene | Carbamoyl | 4-(β-Sulfatoethylsulfonyl)-phenyl | Methoxy | Methyl | H | orange (360) |
| 9 | 1,4-Phenylene | Carbamoyl | 4-(β-Sulfatoethylsulfonyl)-phenyl | Acetylamino | Hydrogen | H | orange (386) |
| 10 | 1,4-Phenylene | Carbamoyl | 4-(β-Sulfatoethylsulfonyl)-phenyl | Hydrogen | Hydrogen | CH₃ | orange (365) |
| 11 | | | 2-Bromo-4-(β-sulfatoethylsulfonyl)-phenyl | Methyl | Hydrogen | CH₃ | orange |
| 12 | 1,4-Phenylene | Carboxy | 4-(β-Sulfatoethyl-)sulfonyl)-phenyl | Ureido | Hydrogen | CH₃ | orange (375) |
| 13 | 1,4-Phenylene | Carboxy | 1-Sulfo-6-(β-sulfatoethylsulfonyl)-naphth-2-yl | Ureido | Hydrogen | H | orange (388) |
| 14 | 2,2'-Disulfostilben-4,4'-ylene | Carboxy | 4-(β-Sulfatoethylsulfonyl)-phenyl | Ureido | Hydrogen | H | orange (342) |
| 15 | 2,2'-Disulfostilben-4,4'-ylene | Carboxy | 2-Methoxy-5-(β-sulfatoethylsulfonyl)-phenyl | Ureido | Hydrogen | H | orange (365) |
| 16 | 2,2'-Disulfostilben-4,4'-ylene | Carbamoyl | 2-Methoxy-5-(β-sulfatoethylsulfonyl)-phenyl | Ureido | Hydrogen | H | orange (394) |
| 17 | 3,3'-Disulfodiphenyl-4,4'-ylene | Carbamoyl | 4-(β-Sulfatoethylsulfonyl)-phenyl | Ureido | Hydrogen | H | orange |
| 18 | 3,3'-Disulfodiphenyl-4,4'-ylene | Carboxy | 4-(β-Sulfatoethylsulfonyl)-phenyl | Ureido | Hydrogen | H | orange |

EXAMPLES 19 to 37

The Table Examples below describe further disazo compounds according to the invention in terms of the symbols appearing in a general formula (B)

peratures between 100° and 140° C., produce on cellulose fiber materials deep, fast dyeings and prints in the hue indicated in the particular Table Example.

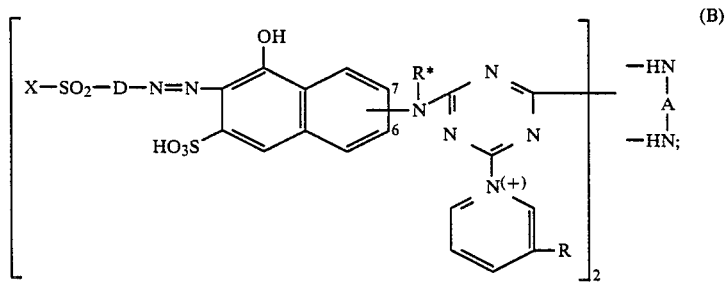

(B)

| Example | Radical A | Group R | Group X—SO₂—D— | R* | 6- or 7-position | Hue (λ$_{max}$ = ... nm) |
|---|---|---|---|---|---|---|
| 19 | 1,4-Phenylene | Carboxy | 2-Methoxy-4-(β-sulfatoethylsulfonyl)-phenyl | H | 7- | red |
| 20 | 1,4-Phenylene | Carboxy | 4-(β-Sulfatoethylsulfonyl)-phenyl | H | 6- | orange (476) |
| 21 | 1,4-Phenylene | Carboxy | 4-(β-Sulfatoethylsulfonyl)-phenyl | CH₃ | 6- | orange (472) |

-continued

| Example | Radical A | Group R | Group X—SO$_2$—D— | R* | 6- or 7- position | Hue ($\lambda_{max}$ = ... nm) |
|---|---|---|---|---|---|---|
| 22 | 2-Sulfo-1,4-phenylen | Carboxy | 2-Methoxy-5-($\beta$-sulfatoethylsulfonyl)-phenyl | CH$_3$ | 6- | red (492) |
| 23 | 2-Sulfo-1,4-phenylen | Carboxy | 2,5-Dimethoxy-4-($\beta$-sulfatoethylsulfonyl)-phenyl | H | 6- | bluish red (500) |
| 24 | 1,4-Phenylene | Carbamoyl | 4-($\beta$-Sulfatoethylsulfonyl)-phenyl | H | 7- | orange (480) |
| 25 | 1,4-Phenylene | Carbamoyl | 4-($\beta$-Sulfatoethylsulfonyl)-phenyl | H | 6- | orange (470) |
| 26 | 1,4-Phenylene | Carbamoyl | 1-Sulfo-6-($\beta$-sulfatoethylsulfonyl)-naphth-2-yl | H | 6- | orange |
| 27 | 2,2'-Disulfo-stilben-4,4'-ylene | Carbamoyl | 1-Sulfo-6-($\beta$-sulfatoethylsulfonyl)-naphth-2-yl | H | 6- | red (492) |
| 28 | 2,2'-Disulfo-stilben-4,4'-ylene | Carbamoyl | 4-($\beta$-Sulfatoethylsulfonyl)-phenyl | CH$_3$ | 6- | orange |
| 29 | 2,2'-Disulfo-stilben-4,4'-ylene | Carbamoyl | 2-Methoxy-5-($\beta$-sulfatoethylsulfonyl)-phenyl | CH$_3$ | 6- | red |
| 30 | 2,2'-Disulfo-stilben-4,4'-ylene | Carbamoyl | 2,5-Dimethoxy-4-($\beta$-sulfatoethylsulfonyl)-phenyl | H | 6- | red |
| 31 | 2,2'-Disulfo-stilben-4,4'-ylene | Carbamoyl | 2-Bromo-4-($\beta$-sulfatoethylsulfonyl)-phenyl | H | 6- | orange |
| 32 | 3,3'-Disulfo-stilben-4,4'-ylene | Carbamoyl | 2-Bromo-4-($\beta$-sulfatoethylsulfonyl)-phenyl | H | 6- | red |
| 33 | 3,3'-Disulfo-stilben-4,4'-ylene | Carboxy | 4-($\beta$-Sulfatoethylsulfonyl)-phenyl | H | 6- | red |
| 34 | 3,3'-Disulfo-stilben-4,4'-ylene | Carboxy | 2-Methyl-5-methoxy-4-($\beta$-sulfatoethylsulfonyl)-phenyl | H | 6- | red |
| 35 | 2,2'-Disulfo-diphenyl-4,4'-ylene | Carboxy | 4-($\beta$-Sulfatoethylsulfonyl)-phenyl | H | 6- | orange |
| 36 | SO$_3$H-substituted bis(phenyl)-NH-CO-NH structure with SO$_3$H | Carboxy | 4-($\beta$-Sulfatoethylsulfonyl)-phenyl | H | 6- | orange |
| 37 | SO$_3$H-substituted bis(phenyl)-NH-CO-NH structure with SO$_3$H | Carbamoyl | 4-($\beta$-Sulfatoethylsulfonyl)-phenyl | H | 6- | orange |

The Table Examples which follow describe further disazo compounds according to the invention in terms of the symbols appearing in a general formula (C)

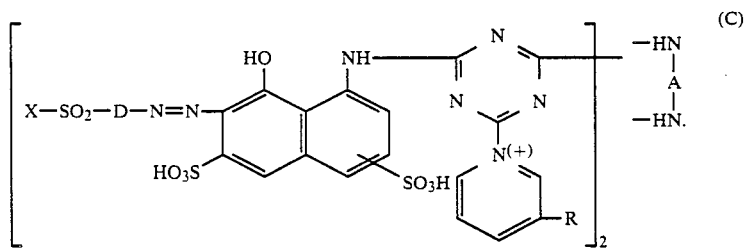
(C)

The compounds according to the invention can be prepared in a manner according to the invention, for example analogously to one of the above Working Examples, using the components evident from the Table Examples, and cyanuric chloride. They have good fiber-reactive dye properties and, not only in the presence of alkaline agents at dyeing temperatures (fixing temperatures) of up to 100° C. but also in the weakly acid to neutral or weakly alkaline range at temperatures between 100° and 140° C., produce on cellulose fiber materials deep, fast dyeings and prints in the hue indicated in the particular Table Example.

| Example | Radical A | Group R | Group X—SO₂—D— | Position of —SO₃H relative to NH | Hue ($\lambda_{max}$ = ... nm) |
|---|---|---|---|---|---|
| 38 | 1,4-Phenylene | Carboxy | 4-(β-Sulfatoethylsulfonyl)-phenyl | meta- | bluish red (510) |
| 39 | 1,4-Phenylene | Carboxy | 4-Vinylsulfonyl-phenyl | meta- | bluish red |
| 40 | 1,4-Phenylene | Carboxy | 2-Bromo-4-(β-sulfatoethylsulfonyl)-phenyl | meta- | bluish red (512) |
| 41 | 2-Sulfo-1,4-phenylene | Carboxy | 4-(β-Sulfatoethylsulfonyl)-phenyl | meta- | bluish red (510) |
| 42 | 1,4-Phenylene | Carbamoyl | 4-(β-Sulfatoethylsulfonyl)-phenyl | meta- | bluish red |
| 43 | 1,4-Phenylene | Carbamoyl | 2-Methoxy-5-(β-sulfatoethylsulfonyl)-phenyl | meta- | reddish violet |
| 44 | 1,4-Phenylene | Carbamoyl | 2-Methoxy-5-(β-sulfatoethylsulfonyl)-phenyl | para- | red |
| 45 | 1,4-Phenylene | Carbamoyl | 2-Methoxy-5-vinylsulfonyl-phenyl | para- | red |
| 46 | 1,4-Phenylene | Carboxy | 4-(β-Sulfatoethylsulfonyl)-phenyl | para- | red (490) |
| 47 | 2,2'-Disulfo-stilben-4,4'-ylene | Carbamoyl | 4-(β-Sulfatoethylsulfonyl)-phenyl | para- | bluish red |
| 48 | 2,2'-Disulfo-stilben-4,4'-ylene | Carboxy | 4-(β-Sulfatoethylsulfonyl)-phenyl | meta- | reddish violet |
| 49 | 2,2'-Disulfo-stilben-4,4'-ylene | Carboxy | 2-chloro-5-methoxy-4-(β-sulfatoethylsulfonyl)-phenyl | meta- | reddish violet (525) |
| 50 | ![SO₃H-phenyl-NH-CO-NH-phenyl-SO₃H] | Carboxy | 4-(β-Sulfatoethylsulfonyl)-phenyl | meta- | bluish red (508) |
| 51 | ![SO₃H-phenyl-NH-CO-NH-phenyl-SO₃H] | Carbamoyl | 4-(β-Sulfatoethylsulfonyl)-phenyl | meta- | bluish red (508) |

-continued

| Example | Radical A | Group R | Group X—SO$_2$—D— | Position of —SO$_3$H relative to NH | Hue ($\lambda_{max}$ = ... nm) |
|---|---|---|---|---|---|
| 52 | [structure: phenyl with SO$_3$H and NH–CO–NH linking to second phenyl with SO$_3$H] | Carbamoyl | 6-(β-Sulfatoethylsulfonyl)-naphth-2-yl | meta- | reddish violet |
| 53 | 3,3'-Disulfodiphenyl-4,4'-ylene | Carbamoyl | 4-(β-Sulfatoethylsulfonyl)-phenyl | meta- | reddish violet |
| 54 | 3,3'-Disulfodiphenyl-4,4'-ylene | Carboxy | 4-(β-Sulfatoethylsulfonyl)-phenyl | meta- | reddish violet |
| 55 | 2,2'-Disulfodiphenyl-4,4'-ylene | Carboxy | 4-(β-Sulfatoethylsulfonyl)-phenyl | meta- | reddish violet |
| 56 | 2,2'-Disulfodiphenyl-4,4'-ylene | Carbamoyl | 4-(β-Sulfatoethylsulfonyl)-phenyl | meta- | reddish violet |

APPLICATION EXAMPLE 1

50 parts of a cotton fabric are introduced into a dye bath composed of 1 part of the disazo compound according to the invention of Example 1 (in the form of a neutral salt), 50 parts of anhydrous sodium sulfate, 800 parts of water and 200 parts of an aqueous buffer solution prepared from 200 parts of water and 20 parts of 85% strength phosphoric acid and brought to pH 6 with sodium hydroxide solution. The fabric is treated in the bath at a temperature of 130° C. with constant agitation for 90 minutes. The dyeing obtained is then aftertreated by rinsing with warm and with hot water, by washing in an aqueous bath composed of 1,500 parts of water and 1.5 parts of a non-ionic agent at the boil for 15 minutes, and rinsing again with warm water, and dried.

The result obtained is a deep blueish-red dyeing which has a good light fastness on dry and moist fabric, including a good perspiration light fastness, and good wet fastness properties, such as a good water, 60° C. and 95° C. wash, perspiration and chlorinated water fastness, and also a good crock fastness. In addition the compound according to the invention exhibits a good color buildup in this dyeing process.

If the dyeing process is carried out not at pH 6 but at pH 5, pH 7 or pH 8, similar blueish-red dyeings having virtually the same depth of shade as the dye prepared at pH 6 are obtained.

APPLICATION EXAMPLE 2

If the disazo compound according to the invention of Example 1 is used for dyeing cellulose fiber material, such as cotton fabric, in a dyeing method customary for fiber-reactive dyes, for example in an exhaust method at a temperature of 60° C. or 80° C. in the presence of an alkaline agent, such as sodium carbonate and sodium hydroxide solution, and of an electrolyte salt such as sodium sulfate, this likewise produces very deep blueish-red dyes having good fastness properties, of which in particular the good light fastness on dry and moist fabric, including a good perspiration light fastness, and also the good crock fastness and the good water, wash, perspiration and chlorinated water fastness properties can be singled out.

APPLICATION EXAMPLE 3

A dye bath is prepared from 80 parts of water, 0.05 part of the disazo compound according to the invention of Example 4, 5 parts of anhydrous sodium sulfate and 20 parts of an aqueous buffer solution which is capable of maintaining a pH value of 6, and 0.1 part of a predispersed disperse dye of Colour Index No. 11,227 (C.I. Disperse Orange 25) and 0.1 part of a commercially available dispersant customary for use with disperse dyes, such as ligninsulfonic acid, are then added.

This dyeing liquor is used to dye 5 parts of a polyester/cotton blend fabric (50:50) at a temperature of 130° C. and at a pH value of 6 for 90 minutes. The dyed fabric is then taken out of the dyeing liquor and aftertreated and finished (for example as described in Application Example 1). The result obtained is a uniformly dyed orange fabric where both the fiber portions are fully penetrated. The dyeing has the good fastness properties of the cotton dyeings of Example 4 and of the polyester dyeings of the known disperse dye.

APPLICATION EXAMPLE 4

A dye bath is prepared from 59 parts of water, 1 part of the disazo compound according to the invention of Example 3, 50 parts of anhydrous sodium sulfate and 5 parts of phosphoric acid, and the bath is brought to pH 4.5 with sodium carbonate. 50 parts of a cotton fabric are then introduced, and the dyeing is carried out in a sealed apparatus at a dyeing temperature of 140° C. by constantly agitating for 30 minutes. The dyed fabric is then removed and finished by rinsing with hot and cold water, by treatment at the boil for 15 minutes in an aqueous bath containing a small amount of a nonionic detergent, by rinsing again with water and drying.

The result obtained is a deep orange cotton fabric having very good fastness properties.

We claim:

1. A disazo compound which conforms to the formula

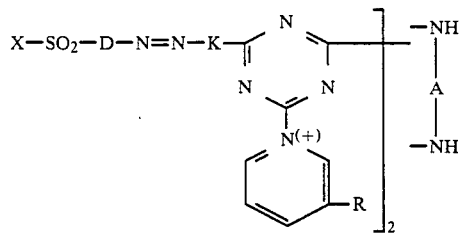

in which

A is phenylene unsubstituted or substituted by 1 or 2 substituents selected from the group consisting of methyl, ethyl, methoxy, chlorine and sulfo, or A is a group of the formula

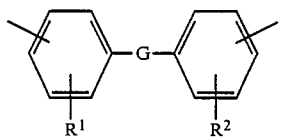

in which

G is a direct bond or the vinylidene group of the formula —CH=CH— or a group of the formula —NH—CO—NH—, $R^1$ is hydrogen or sulfo, methyl, ethyl, methoxy or ethoxy, and $R^2$ has one of the meanings of $R^1$ and is identical to $R^1$ or different from $R^1$;

D is a benzene ring unsubstituted or substituted by 1 or 2 substituents which are selected from the set consisting of 2 methyls, 2 ethyls, 2 methoxys, 2 ethoxys, 1 sulfo, 1 carboxy, 1 chlorine and 1 bromine, or D is a naphthalene ring unsubstituted or substituted by sulfo, or D is a group of the formula

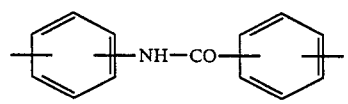

K, as a radical of a coupling component, is a group of the formula

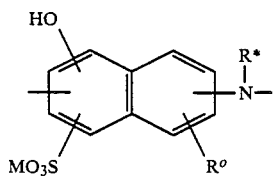

in which

M is hydrogen or an alkali metal, $R^o$ is hydrogen or sulfo, the free azo bond is in the ortho-position to the hydroxy group and $R^*$ is hydrogen, methyl or ethyl, or K is a group of the formula

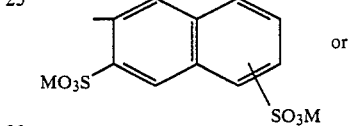

in which $R^*$ is hydrogen, methyl or ethyl and the benzene ring a is unsubstituted or substituted by 1 or 2 substituents selected from the group consisting of methyl, ethyl, methoxy, ethoxy, alkanoylamino of 2 to 5 carbon atoms, benzoylamino, ureido and chlorine;

X is vinyl, β-sulfatoethyl or β-chloroethyl;

R is carboxy or carbamoyl;

the sulfo, sulfato and carboxy groups form anions equivalent to the pyridinium cation.

2. A disazo compound according to claim 1, wherein K is a group of the formula

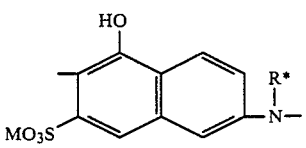

in which M and $R^*$ have the meanings mentioned in claim 1 and the sulfo group marked without position to the naphthalene ring, is bonded in the meta- or para-position to the NH group.

3. A disazo compound according to claim 1, wherein K is a group of the formula

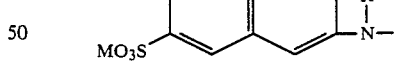

in which M and $R^*$ have the meanings mentioned in claim 1.

4. A disazo compound according to claim 1, wherein K is a group of the formula

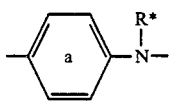

in which $R^*$ and a have the meanings mentioned in claim 1.

5. A disazo compound according to claim 1, wherein K is a group of the formula

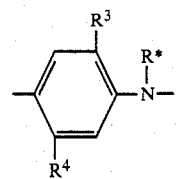

in which $R^3$ is hydrogen, methyl or methoxy and $R^4$ is methyl, acetylamino or ureido.

6. A disazo compound according to claim 1, wherein A is para-phenylene or a sulfo-substituted para-phenylene or a 2,2'- or 3,3'-disulfo-diphen-4,4'-ylene or a group of the formula

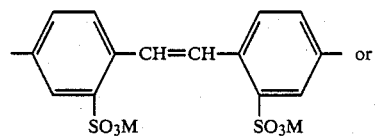

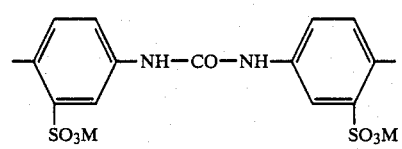

in which M has the meaning mentioned in claim 1.

7. A disazo compound according to claim 2, wherein A is para-phenylene or a sulfo-substituted para-phenylene or a 2,2'- or 3,3'-disulfo-diphen-4,4'-ylene or a group of the formula

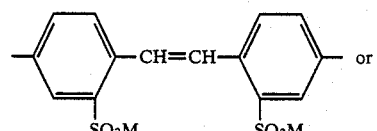

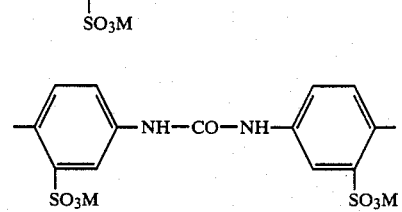

in which M is hydrogen or an alkali metal.

8. A disazo compound according to claim 3, wherein A is para-phenylene or a sulfo-substituted para-phenylene or a 2,2'- or 3,3'-disulfo-diphen-4,4'-ylene or a group of the formula

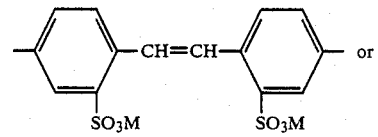

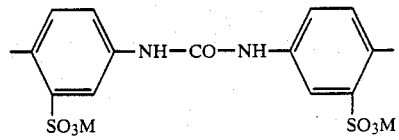

in which M is hydrogen or an alkali metal.

9. A disazo compound according to claim 4, wherein A is para-phenylene or a sulfo-substituted para-phenylene or a 2,2'- or 3,3'-disulfo-diphen-4,4'-ylene or a group of the formula

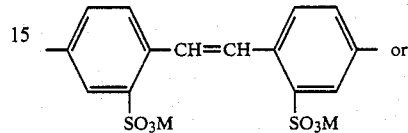

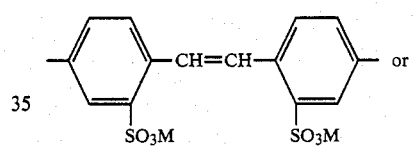

in which M is hydrogen or an alkali metal.

10. A disazo compound according to claim 5, wherein A is para-phenylene or a sulfo-substituted para-phenylene or a 2,2'- or 3,3'-disulfo-diphen-4,4'-ylene or a group of the formula

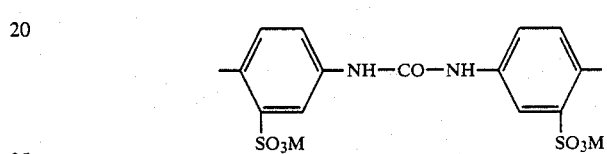

in which M is hydrogen or an alkali metal.

11. A compound according to claim 1, wherein D is a benzene ring unsubstituted or substituted by 1 or 2 substituents selected from the set consisting of 2 methoxys, 1 methyl, 1 chlorine and 1 bromine, or is a naphthalene ring unsubstituted or substituted by sulfo.

12. A compound according to claim 2, wherein D is a benzene ring unsubstituted or substituted by 1 or 2 substituents selected from the set consisting of 2 methoxys, 1 methyl, 1 chlorine and 1 bromine, or is a naphthalene ring unsubstituted or substituted by sulfo.

13. A compound according to claim 3, wherein D is a benzene ring unsubstituted or substituted by 1 or 2 substituents selected from the set consisting of 2 methoxys, 1 methyl, 1 chlorine and 1 bromine, or is a naphthalene ring unsubstituted or substituted by sulfo.

14. A compound according to claim 4, wherein D is a benzene ring unsubstituted or substituted by 1 or 2 substituents selected from the set consisting of 2 methoxys, 1 methyl, 1 chlorine and 1 bromine, or is a naphthalene ring unsubstituted or substituted by sulfo.

15. A compound according to claim 5, wherein D is a benzene ring unsubstituted or substituted by 1 or 2 substitutents selected form the set consisting of 2 methoxys, 1 methyl, 1 chlorine and 1 bromine, or is a naphthalene ring unsubstituted or substituted by sulfo.

16. A compound according to claim 1, wherein X is β-sulfatoethyl.

* * * * *